(12) United States Patent
Ujiie et al.

(10) Patent No.: US 9,621,804 B2
(45) Date of Patent: Apr. 11, 2017

(54) DISPLAY TERMINAL, DISPLAY CONTROL DEVICE, DISPLAY CONTROL METHOD, DISPLAY METHOD AND IMAGE DISPLAY SYSTEM

(71) Applicants: Masahiro Ujiie, Tokyo (JP); Masanori Ishigami, Tokyo (JP); Tsuyoshi Shigemasa, Tokyo (JP); Yoshinaga Kato, Kanagawa (JP)

(72) Inventors: Masahiro Ujiie, Tokyo (JP); Masanori Ishigami, Tokyo (JP); Tsuyoshi Shigemasa, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/457,234

(22) Filed: Aug. 12, 2014

(65) Prior Publication Data
US 2015/0049237 A1   Feb. 19, 2015

(30) Foreign Application Priority Data

Aug. 14, 2013  (JP) ................................. 2013-168712
Jan. 10, 2014  (JP) ................................. 2014-002962

(51) Int. Cl.
*H04N 5/232*  (2006.01)
*H04N 5/225*  (2006.01)
*H04N 7/14*   (2006.01)

(52) U.S. Cl.
CPC ....... *H04N 5/23241* (2013.01); *H04N 5/2257* (2013.01); *H04N 5/23293* (2013.01);
(Continued)

(58) Field of Classification Search
CPC ............... H04N 5/2253; H04N 5/2257; H04N 5/23241; H04N 5/23293; H04N 7/142; H04N 2007/145
See application file for complete search history.

(56) References Cited

U.S. PATENT DOCUMENTS 5,903,706 A   5/1999  Wakabayashi et al.
6,700,621 B1 * 3/2004  Seo .......................... H04N 1/00
                                                        348/333.06
(Continued)

FOREIGN PATENT DOCUMENTS

EP   1 383 324 A1   1/2004
JP   2730452        3/1998
(Continued)

OTHER PUBLICATIONS

Extended European Search Report issued Mar. 10, 2015 in Patent Application No. 14180532.5.

*Primary Examiner* — Daniel M Pasiewicz
(74) *Attorney, Agent, or Firm* — Oblon, McClelland, Maier & Neustadt, L.L.P.

(57) ABSTRACT

A display terminal, in which a supply of electric power from a battery can also be performed, includes an imaging unit that performs imaging to generate an image; a display unit that displays the image generated by the imaging unit; a detection unit that detects whether a direction of the imaging unit while imaging to generate the image to be generated by the imaging unit is being changed; and a power supply interruption unit that interrupts the supply of the electric power from the battery to the imaging unit when the detection unit detects that the direction of imaging to generate the image to be generated by the imaging unit is being changed.

12 Claims, 9 Drawing Sheets

(52) U.S. Cl.
CPC ........... *H04N 7/142* (2013.01); *H04N 5/2253* (2013.01); *H04N 2007/145* (2013.01)

(56) References Cited

U.S. PATENT DOCUMENTS

| | | | | |
|---|---|---|---|---|
| 7,245,482 B2* | 7/2007 | Kim | ...................... | G06F 1/1616 345/156 |
| 2004/0012701 A1* | 1/2004 | Nagai | ................... | G06F 1/1616 348/333.12 |
| 2004/0189851 A1* | 9/2004 | Son | ...................... | G02B 13/001 348/335 |
| 2005/0128284 A1* | 6/2005 | Hoffer | .................... | H04N 7/142 348/14.02 |
| 2005/0285963 A1* | 12/2005 | Misawa | ............. | H04N 5/23293 348/333.06 |
| 2006/0239653 A1* | 10/2006 | Morimoto | ............ | H04N 5/2251 386/224 |
| 2007/0115382 A1* | 5/2007 | Fukuma | ................. | G03B 17/04 348/333.06 |
| 2007/0140686 A1* | 6/2007 | Misawa | ................. | G03B 17/02 396/535 |
| 2008/0239135 A1* | 10/2008 | Tamura | .............. | H04N 13/0217 348/335 |
| 2009/0109325 A1* | 4/2009 | Imai | ....................... | G03B 17/00 348/373 |
| 2010/0158511 A1 | 6/2010 | Zhang | | |
| 2010/0201801 A1* | 8/2010 | Maruyama | ........... | H04N 5/2251 348/82 |
| 2014/0009628 A1* | 1/2014 | Jang | ................... | H04N 5/23222 348/207.1 |

FOREIGN PATENT DOCUMENTS

| | | |
|---|---|---|
| JP | 2002-262164 A | 9/2002 |
| JP | 2007-311981 | 11/2007 |

* cited by examiner

DISPLAY TERMINAL, DISPLAY CONTROL DEVICE, DISPLAY CONTROL METHOD, DISPLAY METHOD AND IMAGE DISPLAY SYSTEM

BACKGROUND OF THE INVENTION

1. Field of the Invention

The disclosures herein generally relate to a display terminal, a display control device and a display control method, a display method and an image display system.

2. Description of the Related Art

Some image transmission/reception apparatuses generate (record) an image (or video) and display the images. Moreover, some image transmission/reception apparatuses, for example, using plural display terminals which include (or connect) image units, send/receive an image (or a video) generated by imaging by each of the plural display terminals bi-directionally and communicate.

Japanese Published Patent Application No. 2007-311981 discloses a related art case of a communication system in which an image sent from a display terminal equipped with a camera (imaging unit) is displayed on display devices of other display terminals, and a conversation is performed by the plural display terminals. For such a display terminal, for example, a communication apparatus connected wirelessly or by wire, such as a personal computer, a mobile phone and a smartphone is used. Moreover, at the display terminal that sends/receives an image generated by imaging with the camera, for example, by changing a direction of imaging of the camera, it is possible to send an image of the user or of the people around the user or a landscape.

Moreover, the camera provided in the display terminal is configured so that in a case supported rotatably by a housing, an image sensor for the camera and a lens part, and a circuit substrate for outputting an image from the camera are stored. And, the display terminal is configured so that it is downsized, there is weight saving, it is carriable, has a charging type battery built-in, and can be used where there is not an outlet of power supply or outdoors.

In the apparatus disclosed in Japanese Published Patent Application No. 2007-311981 as above, when the camera is rotated during imaging and the direction of imaging is changed, an image cannot be displayed correctly. For example, in the case where the camera is turned 180°, and the direction of imaging is changed, the displayed image may flip vertically. In this way, since in the case of changing the direction of imaging by the camera, the image displayed on the display may be disordered temporarily, it is considered to display a predetermined setting screen generated by mask processing instead of the image generated by imaging.

In the case of performing the mask processing like this, it is a state of energization in the camera though the image generated by the camera is not displayed, it generates an image and outputs the generated image. Therefore, conventionally, there is a problem that since the energization is continuously performed, an exhaustion of the battery energy is fast, a rise of temperature inside the camera becomes higher, and there is concern about an influence on electronic parts mounted on the circuit substrate.

SUMMARY OF THE INVENTION

It is a general object of at least one embodiment of the present invention to provide a display terminal, a display control device and display control method, a display method and an image display system that substantially obviate one or more problems caused by the limitations and disadvantages of the related art.

In one embodiment, a display terminal, in which a supply of electric power from a battery can also be performed, includes an imaging unit that performs imaging to generate an image; a display unit that displays the image generated by the imaging unit; a detection unit that detects whether a direction of the imaging unit while imaging to generate the image to be generated by the imaging unit is being changed; and a power supply interruption unit that interrupts the supply of the electric power from the battery to the imaging unit when the detection unit detects that the direction of imaging to generate the image to be generated by the imaging unit is being changed.

In another embodiment, a display control method for controlling an operation of displaying an image in a display terminal, in which a supply of electric power from a battery can also be performed, includes controlling an operation of imaging to generate an image by an imaging unit; controlling an operation of displaying the image generated by the imaging unit; and controlling an operation of detecting whether a direction of the imaging unit while imaging to generate the image to be generated by the imaging unit is being changed. The controlling the operation of imaging to generate the image includes interrupting the supply of the electric power from the battery to the imaging unit when the direction of imaging to generate the image to be generated by the imaging unit is detected to be changing.

In yet another embodiment, a display method for displaying an image in a display terminal, in which a supply of electric power from a battery can also be performed, includes imaging to generate an image by an imaging unit; displaying the image generated by the imaging unit; detecting whether a direction of the imaging unit of imaging to generate the image to be generated by the imaging unit is changed; and interrupting the supply of the electric power from the battery to the imaging unit when the direction of imaging to generate the image to be generated by the imaging unit is detected to be changed.

According to the present invention, in the case where it is detected that the direction of imaging by the imaging unit is changed, the power supply to the imaging unit is interrupted, and the exhaustion of the battery energy is suppressed.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

In the following, nonlimiting embodiments of the present invention will be described using a display control device that images an image and controls an operation of displaying the generated image and a display terminal. Meanwhile, in the following explanations, the same or corresponding members or parts described in the attached drawings have the same or corresponding reference numerals assigned, and a duplicate explanation is omitted. Moreover, the drawings do not aim at showing relative ratios between members or parts. Accordingly, specific sizes can be determined by a person skill in the art in the light of the following nonlimiting embodiments.

The present invention can be applied to, other than the display control device or the like which will be explained in the following, any device provided with an imaging unit and a display unit that can switch a direction of imaging by the imaging unit (apparatus, device, unit, system or the like).

First Embodiment

Figure 1:
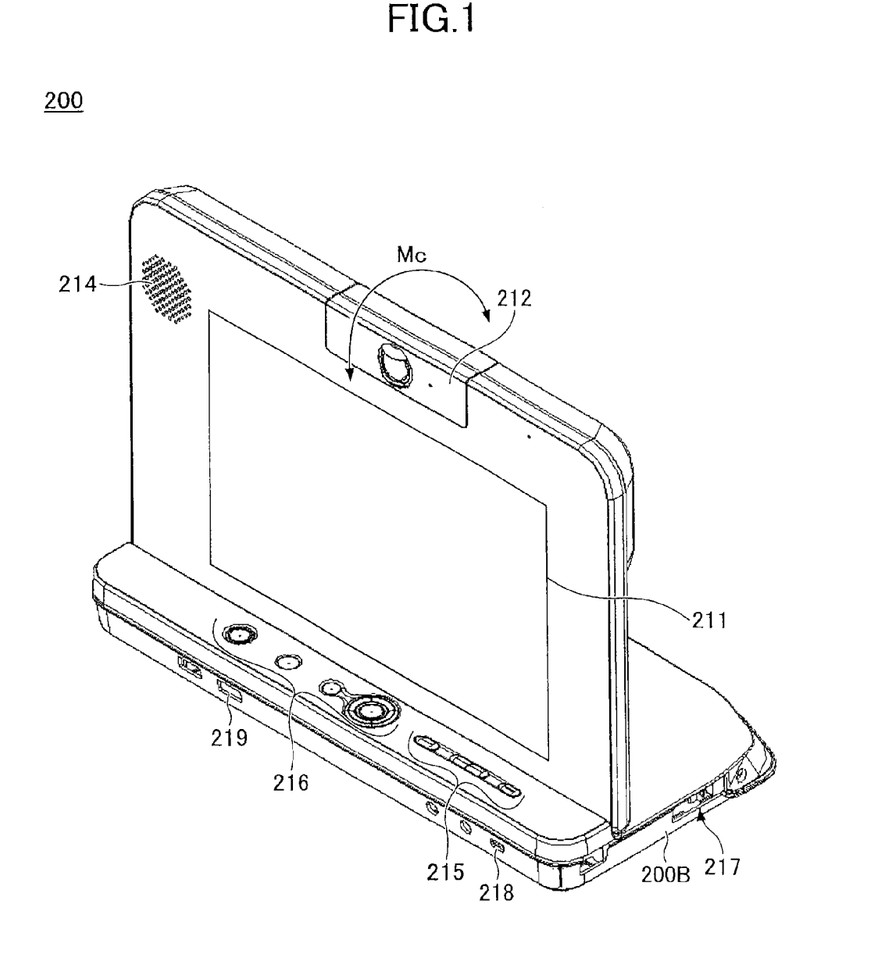
FIG. 1 is a perspective view explaining an example of a display terminal according to a first embodiment.
Figure 2A:
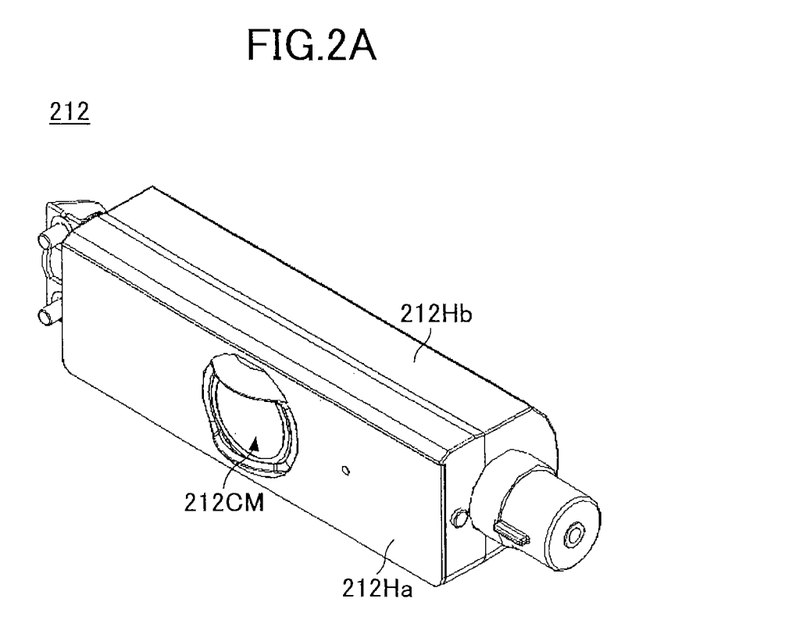
FIGS. 2A and 2B are perspective views explaining an example of an imaging unit of the display terminal according to the first embodiment.
Figure 2B:
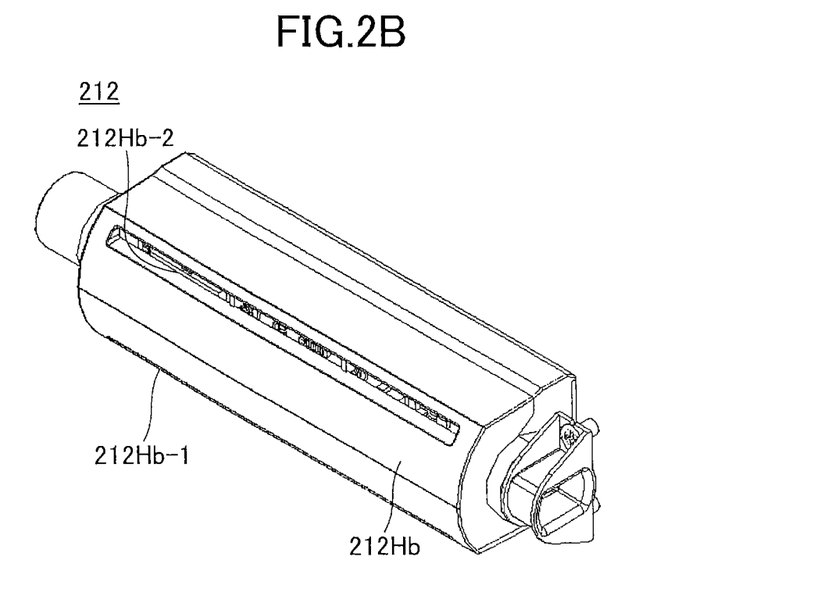
Figure 3:
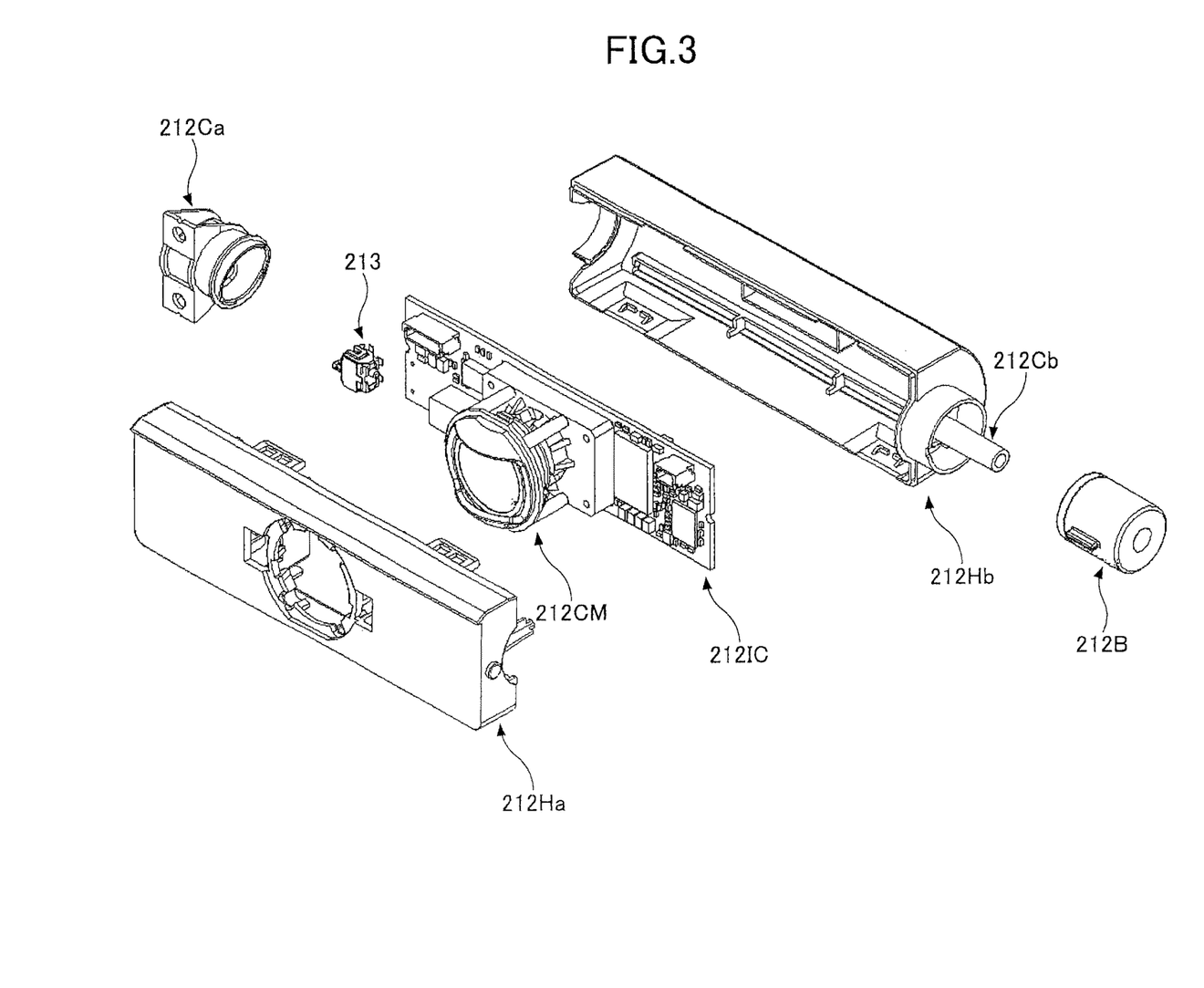
FIG. 3 is an exploded perspective view explaining an example of the imaging unit of the display terminal according to the first embodiment.
Figure 4:
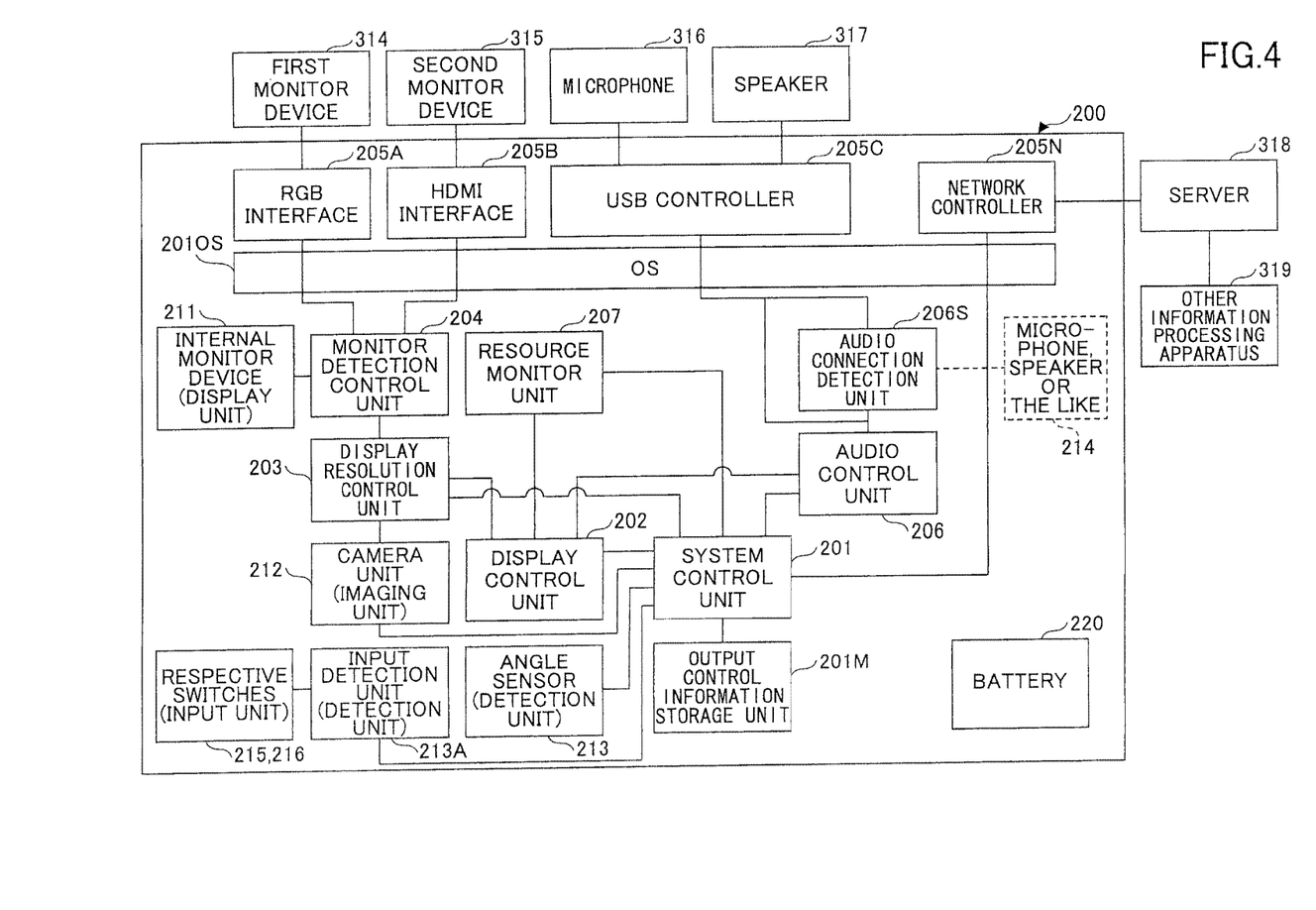
FIG. 4 is a functional block diagram explaining an example of functions of the display terminal according to the first embodiment.
Figure 5A:
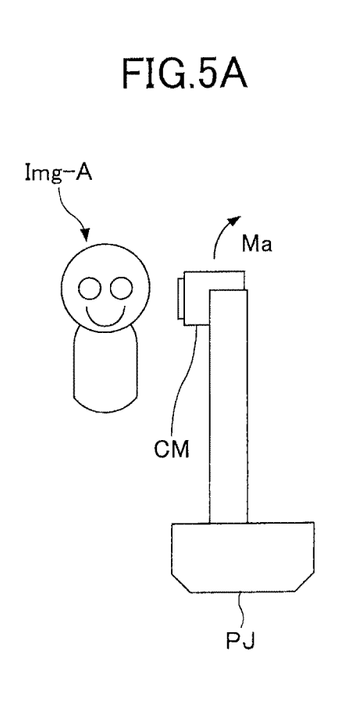
FIGS. 5A to 5D are explanatory diagrams explaining an example of a display operation of the display terminal.
Figure 5B:
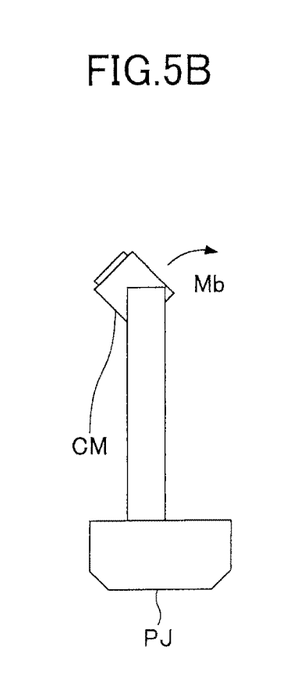
Figure 5C:
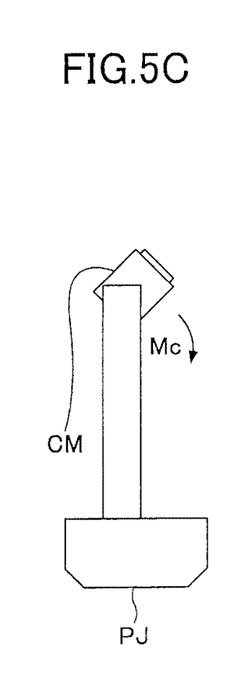
Figure 5D:
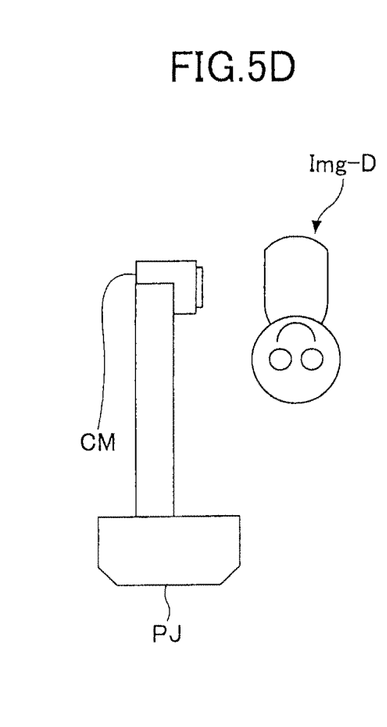

FIG. 1 is a perspective view explaining an example of a display terminal according to a first embodiment. FIGS. 2A and 2B are perspective views explaining an example of an imaging unit of the display terminal according to the first embodiment. FIG. 3 is an exploded perspective view explaining an example of the imaging unit of the display terminal according to the first embodiment. FIG. 4 is a functional block diagram explaining an example of a function of the display terminal according to the first embodiment. Meanwhile, the display terminal to which the present invention can be applied is not limited to the one shown in FIGS. 1 to 4.

As shown in FIG. 1, the display terminal 200 is a terminal device for a video conference having a display unit 211 (liquid crystal panel) for displaying a display image, and an imaging unit 212 rotatably mounted in the upper part of the display unit 211.

The imaging unit 212, via a hinge, is attached to a chassis 200B via a site including the display unit 211 and the imaging unit 212. That is, the imaging unit 212 is rotatably attached to the site including the display unit 211 and the imaging unit 212 attached to the chassis 200B with an angular range from 0 degrees to about 900 degrees.

The display terminal 200 can supply electric power from an AC 100 V power source via an AC adapter. Moreover, in the bottom face of the chassis 200B, a charging type battery 220 (See FIG. 4) is stored. Accordingly, in the case of using the display terminal 200 at a place where there is not the AC 100 V power source (for example, outdoors), it is a communication terminal of a portable type that can conduct a video conference by the electric power supplied from the battery 220.

Moreover, the display terminal 200 has a sound pickup/production unit 214 that picks up and/or produces sound or the like, plural operation switches (input unit) 215, a power switch, a configuration switch, a selection switch and a calibration switch (input unit) 216. These respective switches are an input unit for performing input operations when an operator operates, and in the case where the display unit 211 is a touch panel, the display unit 211 is also an input unit.

The display terminal 200 displays the generated image that the user generates by imaging in the desired direction (position) and at the desired timing as a display image. The display terminal 200, using the display unit 211, displays the generated image (display image) generated by the imaging unit 212. Moreover, the display terminal 200, using a detection unit 213 (See FIG. 3), detects whether the direction of imaging to generate the image is changed and whether an input operation is performed by the respective switch operations. Here, the change of the direction of imaging includes the case where the user changes manually and the case where it is changed automatically by a function with which the display terminal 200 is provided.

Moreover, the display terminal 200, for example, based on information input from an input/output unit (operation by the user) or the like, may control the operation of the display unit 211, the imaging unit 212 and the detection unit 213. Moreover, the display terminal 200, for example, using the input/output unit (operation unit, display unit or the like), may output information regarding a state of the terminal (operation information, processing information, correction information or the like).

The display unit 211 is a unit for displaying a display image. The display unit 211, for example, during the video conference, displays an image generated by imaging by the imaging unit 212 as a display image. Moreover, on the display unit 211, from an imaging control unit 212CM (See FIG. 2A) (imaging unit 212), which will be described later, an image for setting (image used for calibrating the imaging operation) is input. Moreover, the display unit 211, in response to the control by the imaging control unit 212CM, displays the input setting image for a predetermined period of time.

Moreover, the display unit 211 can use a liquid crystal display, an organic EL or a touch panel, or an image (or video) display unit of a general purpose PC, a smartphone, a mobile phone, a table type terminal, a dedicated terminal of a video conference system, a digital camera, a video camera or the like. Moreover, the display unit 211 may be configured so that, for example, a specification of the display image (color tone, brightness, resolution or the like) is adjusted by the user. Moreover, the display unit 211 may be configured so as to display, for example, one or more of plural generated images input from plural imaging units 212.

Meanwhile, the display terminal 200 may be configured so as not to be provided with the sound pickup/production unit 214. That is, the display terminal 200 may be configured so as to use an external microphone and a speaker. Accordingly, the display terminal 200 is a communication terminal having the display unit 211, the imaging unit 212, the sound pickup/production unit 214, and also having a communication unit that can participate in a video conference via a network.

Furthermore, the display terminal 200 has on a side face of the chassis 200B a connection unit 217 for a power supply cable, on an edge part of an upper face of the chassis 200B an external device connection unit 218 (USB terminal, audio terminal or the like) and on a front side face of the chassis 200B a display connection unit 219 (RGB connector or the like).

As shown in FIGS. 2A, 2B and 3, the imaging unit 212 of the display terminal 200 has the imaging control unit 212CM inside a front face housing 212Ha and a rear face housing 212Hb. Here, the imaging control unit 212CM has a lens unit and an imaging element (image sensor), and is attached in an aperture at approximately a center of the front face housing 212Ha. Moreover, in an inner space defined by the front face housing 212Ha and the rear face housing 212Hb, the imaging control unit 212CM including the lens unit, the imaging element (image sensor) and an imaging circuit that processes the generated image by the imaging element or the like is stored.

Moreover, in the imaging unit 212, as described later, inside the front face housing 212Ha and the rear face housing 212Hb, the imaging element and a circuit substrate that processes the generated image output from the imaging element are stored. Accordingly, at the time of imaging mode where electric power is supplied to the imaging unit 212, by heat generated from the imaging element and the circuit substrate, the inside temperature rises. Accordingly, on the rear face housing 212Hb, ventilators 212Hb-1 and 212Hb-2 for transferring the inside heat are formed extended in the width direction.

As shown in FIG. 3, in the imaging unit 212 of the display terminal 200, the imaging control unit 212CM is connected to a substrate 212IC provided with the imaging element. Moreover, the imaging unit 212 is attached rotatably by 180 degrees in the direction of Mc, shown in FIG. 1 (in the longitudinal direction of the display unit), by attachment units 212Ca and 212Cb at both ends of the rear face housing 212Hb.

As shown in FIG. 3, the detection unit 213 of the display terminal 200 is configured so as to be electrically connected to the substrate 212IC and along with the rotation of the substrate 212IC (imaging unit 212) be rotated in the same direction. Moreover, the detection unit 213, in the present embodiment, by a cam (not shown) arranged at the attachment unit 212Ca is ON/OFF switched, and outputs an ON/OFF signal. That is, the detection unit 213 detects the rotational position (0 degrees or 180 degrees) of the imaging unit 212 as the ON/OFF signal. Meanwhile, the detection unit 213 may be configured so as to have an angle sensor, for example, at the attachment unit 212Cb, and detect an angle of the imaging unit 212.

Moreover, for example, at the time of imaging at the place where there is not an AC 100 V power source (for example, outdoors), the substrate 212IC and the imaging control unit 212CM are driven by electric power supplied from the charging type battery 220 (See FIG. 4) stored in the bottom face of the chassis 200B, and output generated images. Accordingly, when a video conference is conducted with other display terminals outdoors or the like, due to electric power consumption by the imaging unit 212 the electric energy of the battery 220 is exhausted.

Accordingly, in the display terminal 200 according to the first embodiment, in the case of changing the direction of imaging by the imaging unit 212 performing the rotational operation during the imaging, or performing input operations by the respective switches during the imaging, the electric power supply is temporarily (predetermined time set preliminarily) halted to the imaging unit 212. By stopping the electric power supply to the imaging unit 212, it becomes possible to suppress the exhaustion of the battery 220 energy, and also it becomes possible to suppress the rise in temperature of the imaging unit 212.

[Function of Display Terminal]

By using FIG. 4, functions of the display terminal 200 will be explained. Here, FIG. 4 is a functional block diagram explaining an example of functions of the display terminal 200. Meanwhile, the functions of the display terminal 200, to which the present invention can apply, are not limited to what will be explained below.

As shown in FIG. 4, the display terminal 200 is connected to a server 318 which forwards data to another information processing apparatus 319 (or display terminal). Moreover, the display terminal 200 is connected to an external input/output device (in the present embodiment, a first monitor device 314, a second monitor device 315, a microphone 316 and a speaker 317) via an RGB interface 205A, an HDMI (trademark registered) interface 205B and a USB controller 205C. Meanwhile, the display terminal 200 may be configured so that the RGB interface 205A or the like is not provided and it is not connected to the external input/output device. That is, the display terminal 200 may, as shown in FIG. 1, display the image generated by the imaging unit 212 only by the display unit 211.

Here, the RGB interface 205A is an interface that drives the first monitor device 314 (for example, a LCD display). The HDMI (trademark registered) interface 205B is an interface that drives the second monitor device 315 implemented as a large-size monitor. The USB controller 205C sends/receives data to/from the microphone 316 and the speaker 317. Meanwhile, the display terminal 200 may implement additionally or alternatively an interface of a format of XGA, SXGA or the like.

A network controller (communication unit) 205N performs data communication between the display terminal 200 and the server 318 and other information processing apparatuses 319. The network controller 205N uses, for example, a communication protocol such as the Ethernet (trademark registered) or IEEE 802.11, and, for example, a communication protocol following the network protocol such as TCP/IP or UDP becomes possible.

The display terminal 200 picks up a sound by using the microphone 316 or a built-in microphone (the sound pickup/production unit 214 in FIG. 1), and forwards it to the other information processing apparatus 319 via the server 318. Moreover, the display terminal 200 receives sound data picked up by the other information processing apparatus 319 from the server 318, and using the speaker 317 or the built-in speaker (sound pickup/production unit 214 in FIG. 1) produces sound. That is, the sound is shared by the display terminal 200 and the other information processing apparatus (display terminal) 319.

Moreover, the display terminal 200 is provided with a monitor detection/control unit 204, a resource monitor unit 207 and an audio connection detection unit 206S.

The monitor detection/control unit 204 outputs an image to the internal monitor device (display unit 211 in FIG. 1), and controls an operation of the internal monitor device. Moreover, the monitor detection/control unit 204 detects whether the external first monitor device 314 and the second monitor device 315 are connected. Here, the monitor detection/control unit 204, upon detecting that the external first monitor device 314 or the like is connected, acquires its performance, a name of a product, a name of device or the like, and outputs a detection result to a display resolution control unit 203, which will be described later.

The resource monitor unit 207 monitors a used amount of a CPU and a memory. The resource monitor unit 207, for example, based on the used amount of the CPU and the memory, controls so that the display terminal 200 may not generate a malfunction stemming from an insufficient resource or the like.

The audio connection detection unit 206S controls input/output of sound to/from the microphone, the speaker or the like (sound pickup/production unit 214 in FIG. 1). Moreover, the audio connection detection unit 206S detects whether an external microphone 316 and a speaker 317 are connected. Here, the audio connection detection unit 206S, upon detecting that the external microphone 316 and the speaker 317 are connected, acquires their performance data, names of products, names of devices or the like, and outputs detection results to an audio control unit 206, which will be described later.

Furthermore, the display terminal 200 includes a display resolution control unit 203, an audio control unit 206, a display control unit 202 and a system control unit 201.

The display resolution control unit 203 determines based on a specification of the internal monitor device (display unit 211) resolution information of a monitor, and outputs the determined resolution information to the system control unit 201. The system control unit 201, based on the input resolution information, generates image information, and outputs the generated image information to the display control unit 202. The display control unit 202 outputs the input image information to the display resolution control unit 203. The display resolution control unit 203, based on the input image information, via the monitor detection/control unit 204 makes the internal monitor device (display unit 211) display the image.

Moreover, the display terminal 200 has an angle sensor (detection unit) 213 for detecting whether the direction of imaging (rotation direction) of the imaging unit 212 is changed, and an input detection unit 213A for detecting whether an input operation by the respective switches (input unit) 215, 216 is performed. And, when it is detected by the angle sensor (detection unit) 213 that the direction of imaging is changed or when the input operation by the respective switches is detected by the input detection unit 213A, the detection signal is sent to the system control unit 201. The system control unit 201, when the direction of imaging is changed or when the input operation by the respective switches 215, 216 is detected, temporarily stops the electric power supply to the camera unit (imaging unit) 212.

In this way, by stopping the electric power supply to the camera unit (imaging unit) 212, it becomes possible to suppress the exhaustion of the battery 220 energy, and also it becomes possible to suppress the temperature rise of the camera unit (imaging unit) 212.

Moreover, the display resolution control unit 203, based on the detection result input from the monitor detection/control unit 204, determines resolution information of a monitor (first monitor device 314 or the like), and outputs the determined resolution information to the system control unit 201. The system control unit 201 outputs image information generated based on the input resolution information to the display control unit 202. The display control unit 202 and the display resolution control unit 203 control the monitor detection/control unit 204 based on the input information, and make the first and second monitor devices 314, 315 display images via OS 201OS and the RGB interface 205A or the HDMI (trademark registered) interface 205B.

The audio control unit 206, based on the input/output level determined by the system control unit 201, controls the microphone, the speaker or the like (sound pickup/production unit 214). Moreover, the audio control unit 206 outputs the detection result input from the audio connection detection unit 206S to the system control unit 201. The system control unit 201, based on the input detection result, determines an input/output level of the connected speaker (external speaker 317), and outputs the determined input/output level to the audio control unit 206.

The display terminal 200, in order to perform control of display resolution and control of an audio environment stores, for example, in an NVRAM, an EEPROM, an EEROM, a flash memory or the like, output control information (image information, control program or the like) in an output control information storage unit 201M. The system control unit 201, using the output information storage control unit 201M, controls the display control unit 202, the display resolution control unit 203, the audio control unit 206, the network controller 205N or the like.

Figure 6:
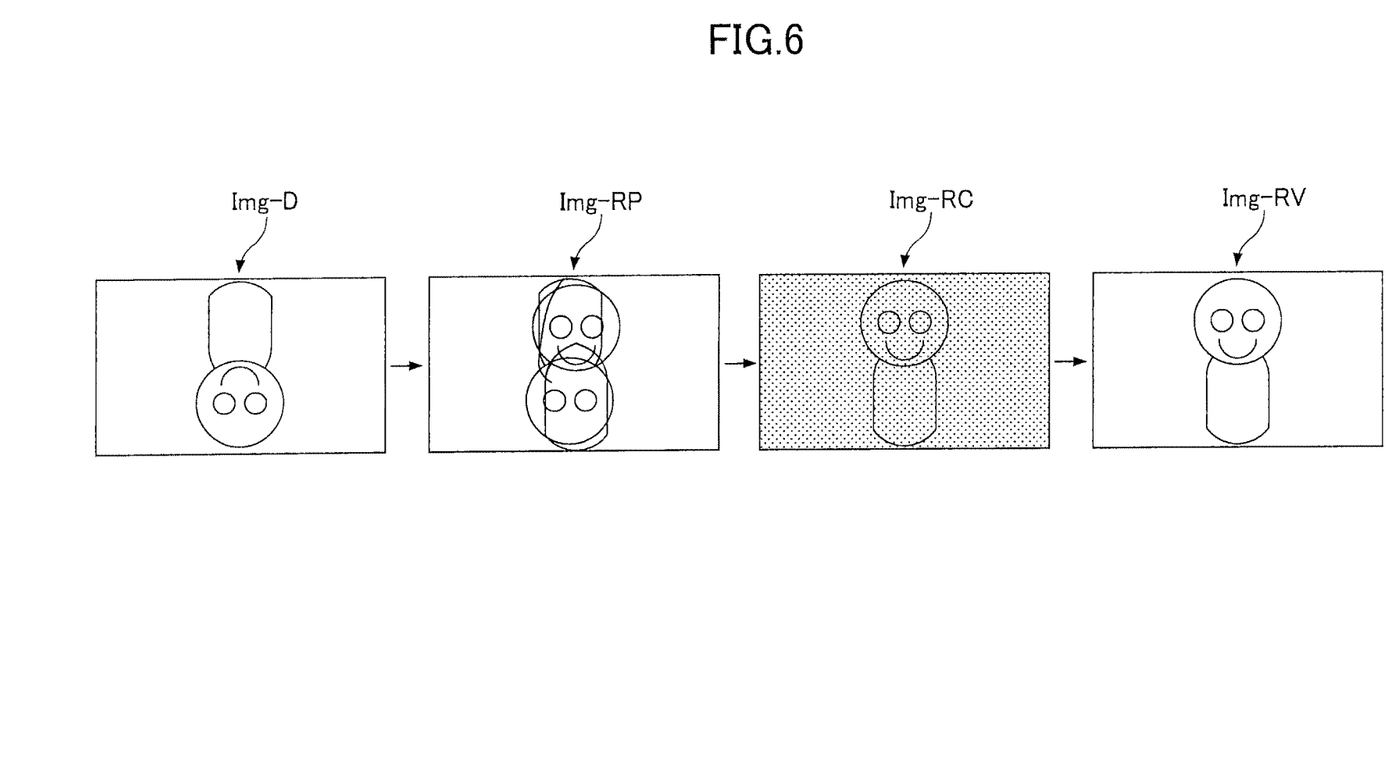
FIG. 6 is an explanatory diagram explaining an example of a switch operation for a display image on the display terminal.

Moreover, the system control unit 201, when the direction of imaging is changed as shown in FIG. 5, stops temporarily the electric power supply to the camera unit (imaging unit) 212, and also adjusts an image displayed on the internal monitor 211 (display unit) as shown in FIG. 6.

Here, the image includes a still image, a moving image, a video image or the like. Switching the direction of imaging is, for example shown in FIG. 5, changing a relative positional relationship of the camera CM (corresponding to the imaging unit 212) to a base PJ (chassis 200B) including the display unit (Ma in FIG. 5A and Mb in Fig. B and Mc in Fig. C). Then, the display unit flips vertically an original image Img-D (Img-D in FIG. 5), for example shown in FIG. 6 (Img-RP), adjust a color tone or the like (Img RC) and afterwards displays the image correctly (Img-RV).

Second Embodiment

Figure 7:
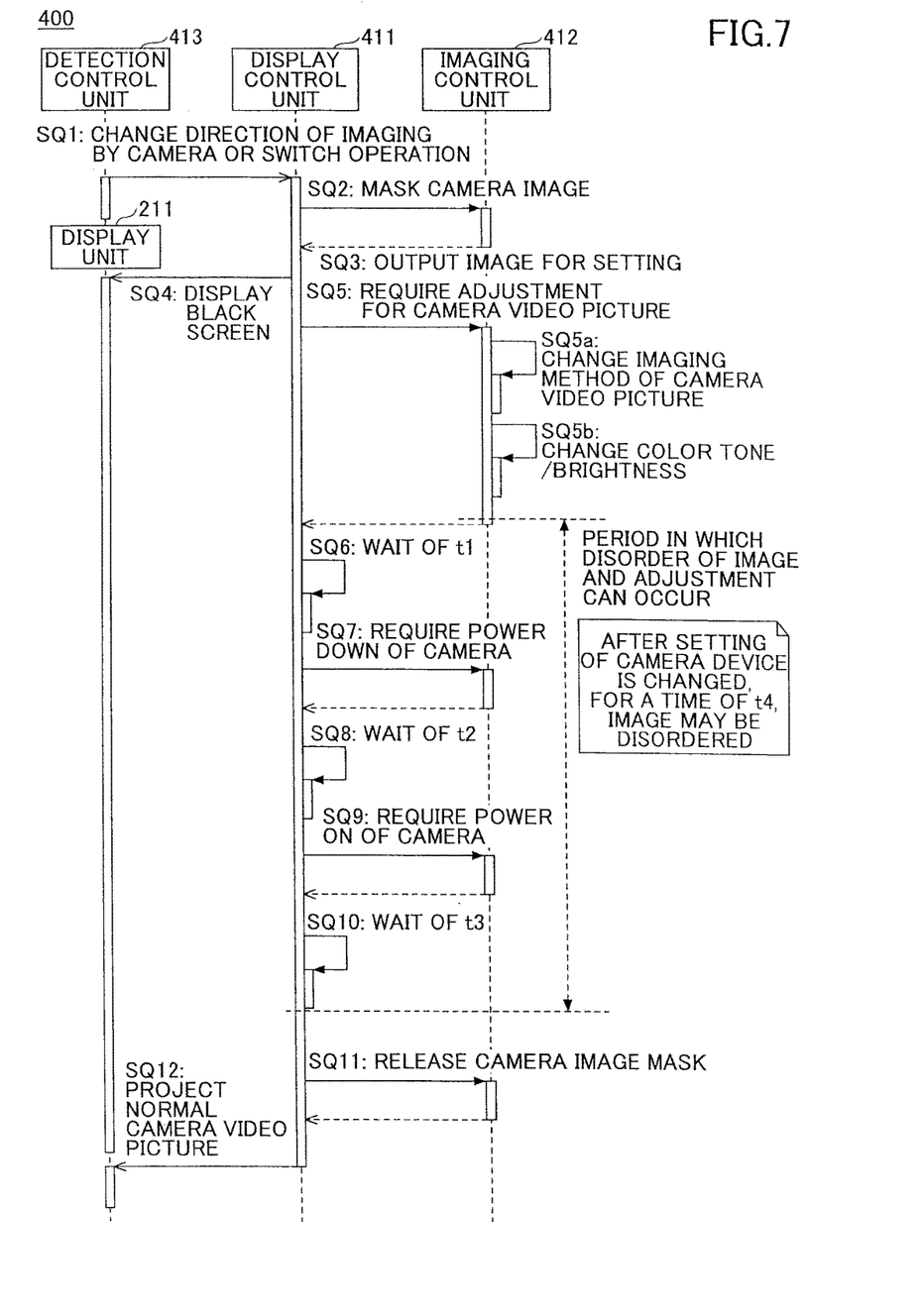
FIG. 7 is a schematic sequence diagram explaining an example of a display control device and a control method according to a second embodiment.
Figure 8:
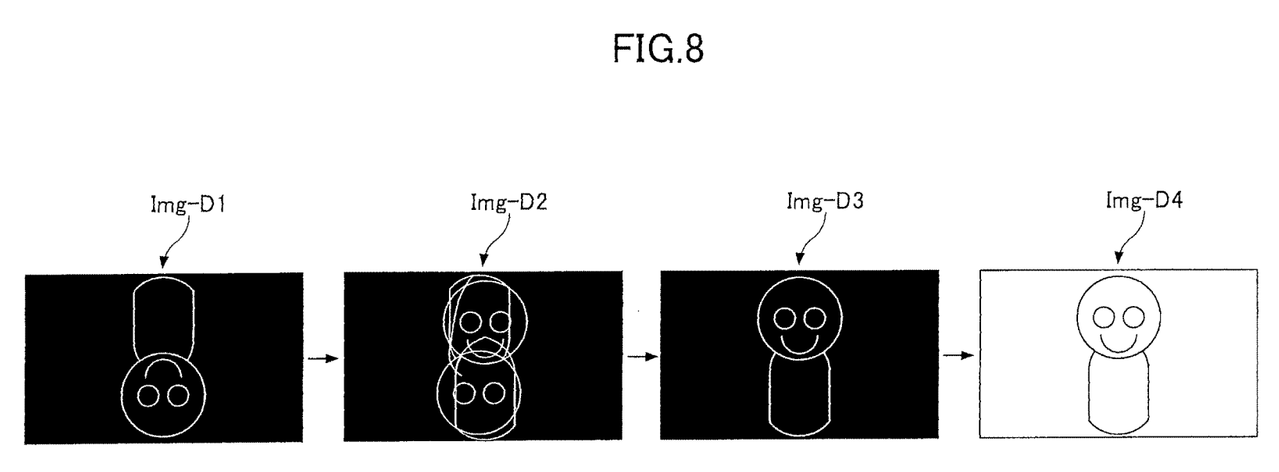
FIG. 8 is an explanatory diagram explaining an example of image processing according to the second embodiment.

FIG. 7 is a schematic sequence diagram explaining an example of a display control apparatus and a control method according to a second embodiment. FIG. 8 is an explanatory diagram explaining an example of image processing according to the second embodiment.

Here, using FIG. 7, a control method of a display terminal by a control process of a display control apparatus 400 (corresponding to a system control unit 201) that controls a display terminal 200 and a display control method will be explained. Meanwhile, the display control apparatus 400 according to the second embodiment performs image processing for a display image displayed on the display unit 212 of the display terminal 200, as described above. Moreover, the display control apparatus 400 detects whether there is a change of the direction of imaging by the imaging unit 212 or whether an input operation by the respective switches 215, 216 is performed, and performs control processing in order to temporarily stop an electric power supply (switching from ON to OFF) to the imaging unit 212.

As shown in FIG. 7, the display control apparatus 400 has a display control unit 411, an imaging control unit 412 and a detection control unit 413 that detects a change of a direction of imaging by the imaging unit 212 and an input operation by the respective switches (input unit) 215, 216. Meanwhile, the display control apparatus 400 may further include an input/output unit that performs input/output of information to/from outside and a storage unit that stores information related to an operation of the display control apparatus 400.

The display control apparatus 400 controls an operation of displaying an image that a user generates by imaging in a desired direction (position) and at a desired timing. The display control apparatus 400, in the present embodiment, using the display control unit 411, controls an operation of displaying a display image generated based on the image generated by imaging. Moreover, the display control apparatus 400, using the imaging control unit 412, controls an operation of imaging to generate an image. Furthermore, the display control apparatus 400, using the detection control unit 413, controls an operation of detecting whether the direction of imaging to generate an image or the input operation by the input unit is performed.

The display control apparatus 400 (the display control unit 411, the imaging control unit 412 and the detection control unit 413), for example, using a program stored in advance in a built-in storage unit (control program, application or the like), may control an operation. Moreover, the display control apparatus 400 (the display control unit 411, the imaging control unit 412 and the detection control unit 413), based on information input from the input/output unit (by a user's operation) or the like, may control the operation. Furthermore, the display control apparatus 400 the display control unit 411, the imaging control unit 412 and the detection control unit 413), using the input/output unit (operation unit or the like), may output information related to control (operation information, processing information, correction information or the like).

The display control unit 411 is a unit that controls an operation of displaying a display image. The display control unit 411 controls an internal or external display unit 211 (See FIG. 1) that displays the display image. The display control unit 411, for example, changes the quality of the display image (color tone, brightness, resolution or the like) to a specification corresponding to the display unit. Moreover, the display control unit 411, for example, may perform control of selecting a display image to be displayed from plural images generated by imaging.

The display control unit 411 controls an operation of displaying an image to be used for calibrating a display operation such as a pattern image (called an "image for setting") on a display unit. Moreover, the display control unit 411, for example, in the case where it is detected that the direction of imaging is being changed by the detection control unit 413, or in the case where it is detected that an input operation is being performed by the input unit, makes the display unit 211 display the image for setting.

Here, the calibration is resetting a display operation when a display method of a display image (removing noise or a disorder of an image, flipping an image vertically or horizontally, enlarging or reducing an image or a trapezoidal correction, moving a position or the like) and the specification of the display image (color tone, brightness, resolution or the like) are changed. A timing of the display control apparatus 400 conducting the calibration includes, other than when the direction of imaging is being changed, for example, when an initial setting is performed by respective switch operations, when it is started up, when the setting is selected by a user, when a setting instruction is input by a remote controller or the like. Moreover, the image for setting is a mask image of black in a whole area, an image of a color bar, a test pattern, an image including a character and an image including information necessary for the other calibration. Meanwhile, an operation at the time of the calibration for a display image related to the display control unit 411 will be explained in a control method which will be described later.

The imaging control unit 412 is a unit of controlling an operation of imaging to generate an image. The imaging control unit 412 controls an operation of the imaging unit 212 that generates an image. The imaging control unit 412, for example, in the case where the imaging unit 212 performs imaging to acquire the generated image (imaging data), controls an operation of imaging to generate an image in a region to be imaged on an imaging element (image sensor) and to acquire a pixel output signal from the imaging element as imaging data. Moreover, the imaging control unit 412 outputs the image generated by the imaging unit 212 (imaging data) to the display control unit 411 as a display image.

Furthermore, the imaging control unit 412, in the case where an operation of changing the direction of imaging by the imaging unit 212 is detected or in the case where an input operation performed by an operation by the respective switches 215, 216 is detected, stops temporarily (predetermined time) electric power supply to the imaging unit 212. According to the stopping of the electric power supply to the imaging unit 212, exhaustion of electric energy of a battery can be suppressed, and also a rise of temperature of the imaging unit 212 can be suppressed.

The detection control unit 413 is a unit that controls an operation of detecting whether the direction of imaging is changed and the input operation by the respective switches 215, 216 (input unit) is performed. The detection control unit 413 controls the detection unit 213 that detects an angle, a position or the like of the imaging unit 212, and a detection operation of an input operation by the respective switches 215, 216. The detection control unit 413 may detect, as the direction of imaging, for example, a change in an angle of the imaging unit 212 relative to the display unit 211. Moreover, the detection control unit 413 may detect, as the change of the direction of imaging, for example, a movement of a position (or movement of rotation) of the imaging unit 212.

[Control Method of Display Terminal]

With reference to FIGS. 7 and 8, a control method of the display control apparatus 400 will be explained. Here, FIG. 8 is an explanatory diagram explaining an example of an operation of the display control apparatus 400 according to the present embodiment switching a display image in the case of changing the direction of imaging. Meanwhile, in FIG. 8, though in images Img-D1, Img-D2 and Img-D3, graphics of white lines are illustrated for explanation, an actual image to be displayed may be a mask image of black in a whole area.

As shown in FIG. 7, the display control apparatus 400, at a sequence SQ1, by a user (user or operator), a direction of imaging by the imaging unit 212 is changed or an input operation is performed by the respective switches 215, 216. Then, the display control apparatus 400 (detection control unit 413), detects that the direction of imaging is changed (a detection control step). Moreover, the detection control unit 413 outputs "positional information" to the display control unit 411. Here, a change in the direction of imaging may be a case of changing manually or a case of changing automatically by a function with which the display control apparatus 400 is provided.

At sequence SQ2, the display control apparatus 400, using the display control unit 411, inputs "output instruction of image for setting" to the imaging control unit 412. Here, the display control unit 411 further outputs information on a predetermined time (for example, a duration time of outputting the mask image) related to the "output of image for setting", which will be described later. Next, at sequence SQ3, the display control apparatus 400 using the imaging control unit 412, conducts the "output image for setting" (imaging control step). The imaging control step, for example as shown in FIG. 8, outputs images for setting Img-D1, Img-D2 and Img-D3 (as an example, a mask image of black in a whole area). Then, the user (operator), for a predetermined time, views a masked black screen.

Here, the predetermined time may be a predetermined time t4 appropriate for a specification of the display control apparatus 400 (or display unit), a communication state between the display control unit 411 (display unit) and the imaging control unit 412 (imaging unit) and/or a quality of a display image to be displayed. Moreover, the predetermined time may be an arbitrary time determined in advance experimentally or by a calculation. Furthermore, the display control apparatus 400 may measure the predetermined time in advance.

Next, at sequence SQ4, the display control apparatus 400 makes a black screen, in which the display unit 211 is masked by the display control unit 411, to be displayed (display control step). Subsequently, at sequence SQ5a, the display control apparatus 400, using the display control unit 411, requires an adjustment of a video picture of the camera. Accordingly, the display control apparatus 400, using the imaging control unit 412, conducts a change of an imaging method, for example, a correction for a generated image (correction corresponding to a detection result, for example, flipping vertically or horizontally, moving a position, enlarging or reducing, a trapezoidal correction or the like). Moreover, at sequence SQ5b, the display control apparatus 400, using the imaging control unit 412, conducts a correction for quality of an image (correction corresponding to a specification of the display unit, for example, a color tone, a brightness, a resolution or the like) (imaging control step).

Next, at sequence SQ6, the display control apparatus 400, using the imaging control unit 412, sends instruction of a wait mode of a predetermined time t1 to the display control unit 411.

Next, at sequence SQ7, the display control apparatus 400, using the display control unit 411, outputs a request for a power down for the camera to the imaging control unit 412. Accordingly, the imaging control unit 412 stops electric power supply to the imaging unit 212, and stops imaging by the imaging unit 212 and outputting an image (imaging control step). According to the stopping of the electric power supply to the imaging unit 212, the exhaustion of electric energy of the battery 220 can be suppressed, and also a rise of temperature of the imaging unit 212 can be suppressed.

At next sequence SQ8, the display control apparatus 400, using the imaging control unit 412 sends instruction of a wait mode of a predetermined time t2 to the display control unit 411.

Afterward, at sequence SQ9, the display control apparatus 400, using the display control unit 411, outputs a request for a power on for the camera to the imaging control unit 412 (imaging control step). Accordingly, the imaging control unit 412 resumes the electric power supply to the imaging unit 212. Then, since the disorder in the image is not converged, the imaging and outputting of an image generated by the imaging unit 212 are in a stopped state.

At next sequence SQ10, the display control apparatus 400, using the imaging control unit 412, sends instruction of a wait mode of a predetermined time t3, to the display control unit 411. And, when the wait mode of the predetermined time t3 by the display control unit 411 ends, a wait mode of a total time t4 ends. Moreover, during this wait mode, the stopping of an electric power supply to the imaging unit 212 and the resuming of the electric power supply are conducted. Meanwhile, the predetermined time t4 of the above wait mode can be set to an arbitrary time, and set arbitrarily according to, for example, a disorder in an image and a time required for an adjustment. That is, a stop time for electric power supply t1 to the imaging unit 212, and the predetermined times t2, t3 of the wait mode of the imaging control unit 412 can be set to an arbitrary time. Moreover, although a case where the predetermined time of the above-described wait modes t2, t3 are set with reference to a predetermined time according to a quality of a display image to be displayed (time when the image is disordered) is explained, it may be longer than or equal to this predetermined time.

At next sequence SQ11, the display control apparatus 400, using the display control unit 411, makes the imaging control unit 412 release an output of a camera image mask.

Afterwards, at sequence S11, the display control apparatus 400, using the display control unit 411, instructs the imaging control unit 412 to output an image generated by the imaging unit 212 to the display unit 211. Then, an operation of imaging by the imaging unit 212 is controlled, and an image generated by the imaging unit 212 is output to the display unit 211 as a display image. Accordingly, on the display unit 211, the image generated by the imaging unit 212 is displayed.

For example, in the case where the imaging unit 212 is rotated in a longitudinal direction with respect to the display unit 211 and a direction of imaging is changed, an image generated in a direction after change is displayed on the display unit 211. Moreover, in the case where an input operation by the respective switches 215, 216 is performed, a display image which is corrected to an image appropriate for an input parameter is displayed on the display unit 211.

Accordingly, the display control apparatus 400 (display control unit 411) ends the operation (or control of operation) of switching a display image (generated image). The display control unit 411, for example as shown in FIG. 8, can display the image Img-D4 generated by the imaging unit 212, a direction of imaging of which is changed. That is, according to the display control apparatus 400, since at the time of an image switch operation when the direction of imaging is changed, an image for setting (for example, a mask image of black in a whole area) can be displayed, it is possible to prevent an image in switching of a display image from being viewed by a user. According to the display control apparatus 400, it is possible to prevent an image including, for example, noise or a disorder in switching of the display image or an image during image processing or the like from being viewed by the user.

Third Embodiment

Configuration of Image Display System

Figure 9:
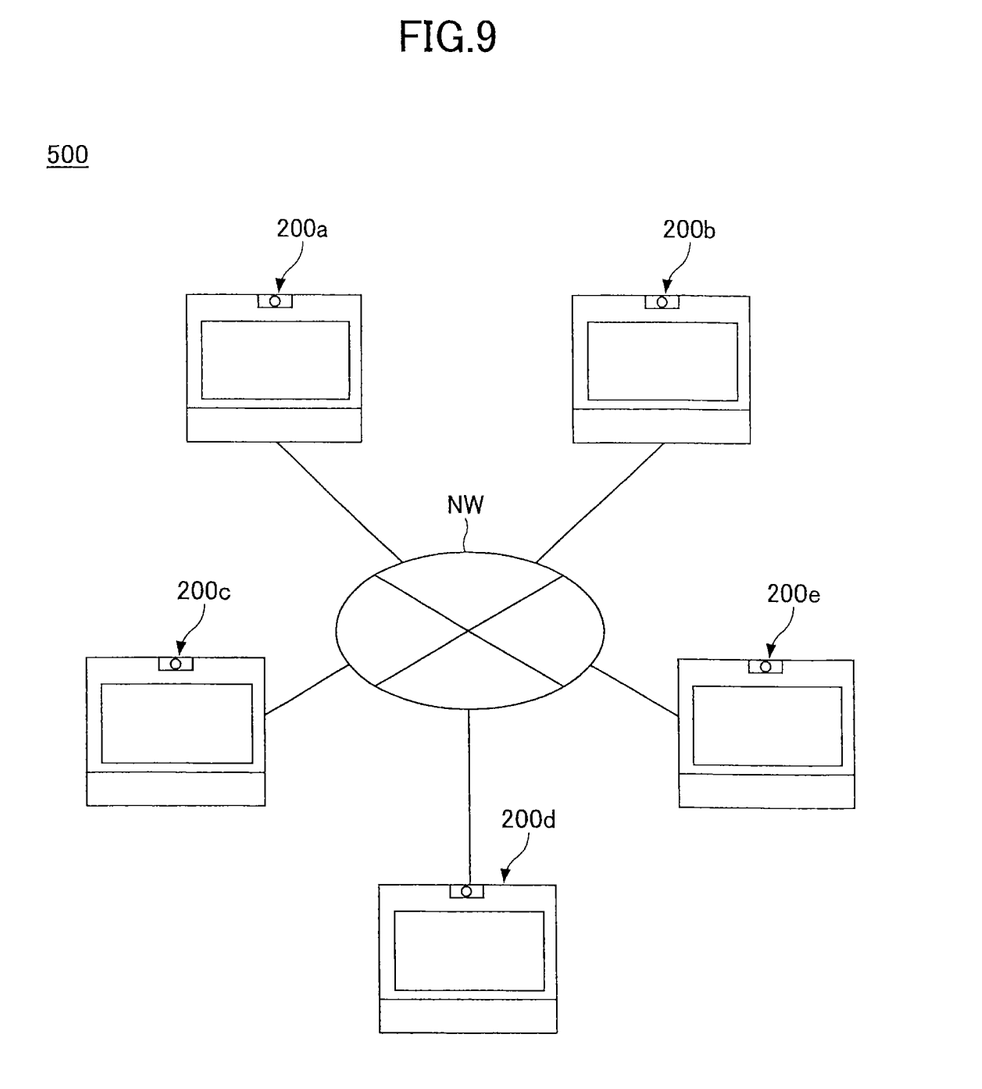
FIG. 9 is a diagram illustrating an example of an image display system according to a third embodiment.

Using FIG. 9, an image display system according to a third embodiment will be explained. Here, FIG. 9 is a schematic system diagram explaining an example of the image display system according to the present embodiment. Meanwhile, the image display system, to which the present invention can be applied, is not limited to that shown in FIG. 9.

As shown in FIG. 9, the image display system 500 connects plural display terminals 200a, 200b, 200c, 200d and 200e (corresponding to the display terminal 200 according to the first embodiment) for communications connections with each other bidirectionally. Moreover, the image display system 500 uses a communication network NW including a wired or wireless network, cloud computing or the like, sends/receives images generated by the plural display terminals (200a to 200e or the like) bidirectionally. That is, the image display system 500 displays an image generated by the imaging unit 212 of the display terminal 200a on the display unit 211 of any of the other display terminals 200b to 200e. Moreover, the image display system 500 displays another image generated by the imaging unit 212 of the display terminal 200b on the display unit 211 of any of the other display terminals 200a, 200c to 200e. Meanwhile, since a configuration of each of the display terminals 200a-200e is the same as the configuration of the display terminal 200 according to the first embodiment, an explanation will be omitted.

[Control Method of Image Display System]

A control method of the image display system 500 (an operation of switching an image when a direction of imaging is changed) according to the third embodiment will be explained. Meanwhile, since the control method of the image display system 500 according to the present embodiment includes the control method of the display terminal 200 according to the first embodiment and the control method of the display control apparatus 400 according to the second embodiment, a different part will be mainly explained.

As shown in FIG. 9, the image display system 500, using the plural display terminals 200a to 200e, generates plural images (imaging step). Moreover, the image display system 500, using the plural display terminals 200a to 200e, displays plural generated images, respectively (display step). That is, in the image display system 500, using the plural display terminals 200a to 200e, plural users share information.

The image display system 500, at one or more of the plural display terminals 200a to 200e, at a timing desired by a user and at a desired position, changes a direction of imaging by the imaging unit 212 (FIG. 1). Then, the image display system 500, using the detection unit 213 (FIG. 6), detects that the direction of imaging by the imaging unit 212 is changed (detection step). Moreover, the image display system 500, using the display unit 211 (and imaging unit 212), displays an image for setting on a display terminal displaying a generated image, a direction of imaging of which is changed (display step, imaging step). That is, in the image display system 500, when the direction of imaging is changed, or when switches are operated and an input operation is performed, at first, a display image being displayed is switched to the image for setting.

Next, the image display system 500, for a predetermined time, continues displaying the image for setting. Here, the image display system 500, in the present embodiment, may further add a time necessary for communication of information between the display terminals 200a-200e, and set the predetermined time. And, while the image for setting is displayed, electric energy supply to the imaging unit 212 is temporarily (predetermined time) stopped. By the stopping of the electric power supply to the imaging unit 212, an exhaustion of electric energy of a battery can be suppressed, and also a rise of temperature of the imaging unit 212 can be suppressed.

The image display system 500, for a predetermined time, performs a setting necessary for displaying correctly a generated image after a switching. The image display system 500 performs, for example, removing noise or a disorder of an image, flipping an image vertically or horizontally, and enlarging or reducing an image or an outer shape correction. Moreover, the image display system 500, for the predetermined time, may reset a display condition (color tone, brightness or the like) of a display terminal displaying a generated image, a direction of imaging of which is changed.

According to this result, the image display system 500, when the display image is being switched (for example, an image including noise or a disorder, an image being processed or the like) without an image being viewed by a user, can switch the display image. Moreover, since the image display system 500 can make the image, when the display image is being switched, not be viewed by the user, it is possible to prevent the user from feeling uncomfortable due to making the image, when the display image is being switched, be viewed by the user. Furthermore, the image display system 500, when the display image is being switched without the image being displayed on a display terminal of the other end of communication, can perform switching of the display image. Meanwhile, the image display system 500 can be applied to a video conference system, a remote conference system or the like.

Further, the present invention is not limited to these embodiments, but various variations and modifications may be made without departing from the scope of the present invention.

The present application is based on and claims the benefit of priority of Japanese Priority Applications No. 2013-168712 filed on Aug. 14, 2013 and No. 2014-002962 filed on Jan. 10, 2014, the entire contents of which are hereby incorporated by reference.

What is claimed is:

1. A display terminal, in which a supply of electric power from a battery can also be performed, comprising:
   a camera that performs imaging to generate an image;
   a display that displays the image generated by camera;
   a sensor that detects whether a direction of the camera is changed in a direction other than towards the display while the camera generates the image; and
   a power supply interrupter that interrupts the supply of the electric power from the battery to the camera when the sensor detects that the direction of the camera is being changed in the direction other than towards the display; and
   a controller that adjusts the image when the sensor detects that the direction of the camera is being changed,
   wherein upon detection that the direction of the camera is changed in the direction other than towards the display, and prior to interruption of the supply of the electric power from the battery to the camera, the controller causes the display to display a black screen, and
   after resumption of the supply of power from the battery to the camera and after the controller adjusts the image, the controller causes the display to remove the black screen and display the image.

2. The display terminal as claimed in claim 1, wherein the sensor detects a motion of the camera to change the direction thereof or an input operation of instructing the camera to change the direction thereof, and
   the power supply interrupter interrupts the supply of the electric power from the battery to the camera when the sensor detects the motion of the camera.

3. The display terminal as claimed in claim 2, wherein the display displays a predetermined image for a predetermined time when the sensor detects the motion of the camera or the input operation.

4. The display terminal as claimed in claim 3, wherein the power supply interrupter sets the predetermined time required for displaying the image generated by the camera after the direction of imaging is changed.

5. A display control device for controlling an operation of displaying the image generated by the camera in the display terminal as claimed in claim 1, the display control device comprising:
- an imaging controller that controls an operation of the camera;
- a display controller that controls an operation of displaying a display image generated based on the image generated by the camera; and
- a detection controller that detects whether a direction of the camera is being changed in a direction other than towards the display terminal, wherein the imaging controller causes the supply of the electric power to the camera to be interrupted when the detection controller detects that the direction of imaging is being changed in the direction other than towards the display terminal while the camera generates the image, the display controller adjusts the display image when the detection controller detects that the direction of imaging is being changed, upon detection that the direction of the camera is changed in the direction other than towards the display, and prior to interruption of the supply of the electric power to the camera, the controller causes the display to display a black screen, and after resumption of the supply of power to the camera and after the controller adjusts the image, the controller causes the display to remove the black screen and display the image.

6. The display control device as claimed in claim 5, wherein
the detection controller detects a motion of the camera to change the direction of the camera or an input operation of instructing the camera to change the direction thereof, and
the imaging controller causes interruption of the supply of the electric power to the camera when the detection controller detects the motion of the camera or the input operation.

7. The display control device as claimed in claim 6, wherein the display controller controls an operation of displaying a predetermined image for a predetermined time when the detection controller detects the motion of the camera or the input operation.

8. An image display system comprising:
a plurality of display terminals as claimed in claim 1 having a communications connection with each other via a network.

9. The display terminal as claimed in claim 1, wherein the power supply interrupter interrupts the supply of the electric power from the battery to the camera for a predetermined amount of time when the sensor detects the motion of the camera or the input operation.

10. The display terminal as claimed in claim 1, wherein the controller adjusts the image by at least one of vertically flipping the image or adjusting a color tone of the image.

11. A display control method for controlling an operation of displaying an image in a display terminal, in which a supply of electric power from a battery can also be performed, comprising:
- controlling imaging to generate an image by a camera;
- controlling display of the image generated by the camera on a display; and
- controlling detection of whether a direction of the camera is changed in a direction other than towards the display while imaging to generate the image, wherein the controlling imaging to generate the image includes interrupting the supply of the electric power from the battery to the camera when the direction of the camera is detected to be changing in the direction other than towards the display, the controlling imaging to generate the image further includes adjusting the image when the direction of the camera is detected to be changing, wherein upon detection that the direction of the camera is changed in the direction other than towards the display, and prior to interruption of the supply of the electric power from the battery to the camera, a black screen is caused to be displayed on the display, and after resumption of the supply of power from the battery to the camera and after adjusting the image, the black screen is caused to be removed from the display and the image is caused to be displayed on the display.

12. A display method for displaying an image in a display terminal, in which a supply of electric power from a battery can also be performed, comprising:
- imaging, by a camera, to generate an image;
- displaying, at a display, the image generated by the camera;
- detecting whether a direction of the camera is changed in a direction other than towards the display;
- interrupting the supply of the electric power from the battery to the camera when the direction of the camera is detected to be changed in the direction other than towards the display; and
- adjusting the image when the direction of the camera is detected to be changed, wherein upon detection that the direction of the camera is changed in the direction other than towards the display, and prior to interruption of the supply of the electric power from the battery to the camera, the display is caused to display a black screen, and after resumption of the supply of power from the battery to the camera and after adjusting the image, the display is caused to remove the black screen and display the image.

* * * * *